March 20, 1956 E. L. CHADWICK 2,738,796
COMBINED VENT AND PRESSURE RELIEF VALVE UNIT
Filed Aug. 11, 1952 3 Sheets-Sheet 1
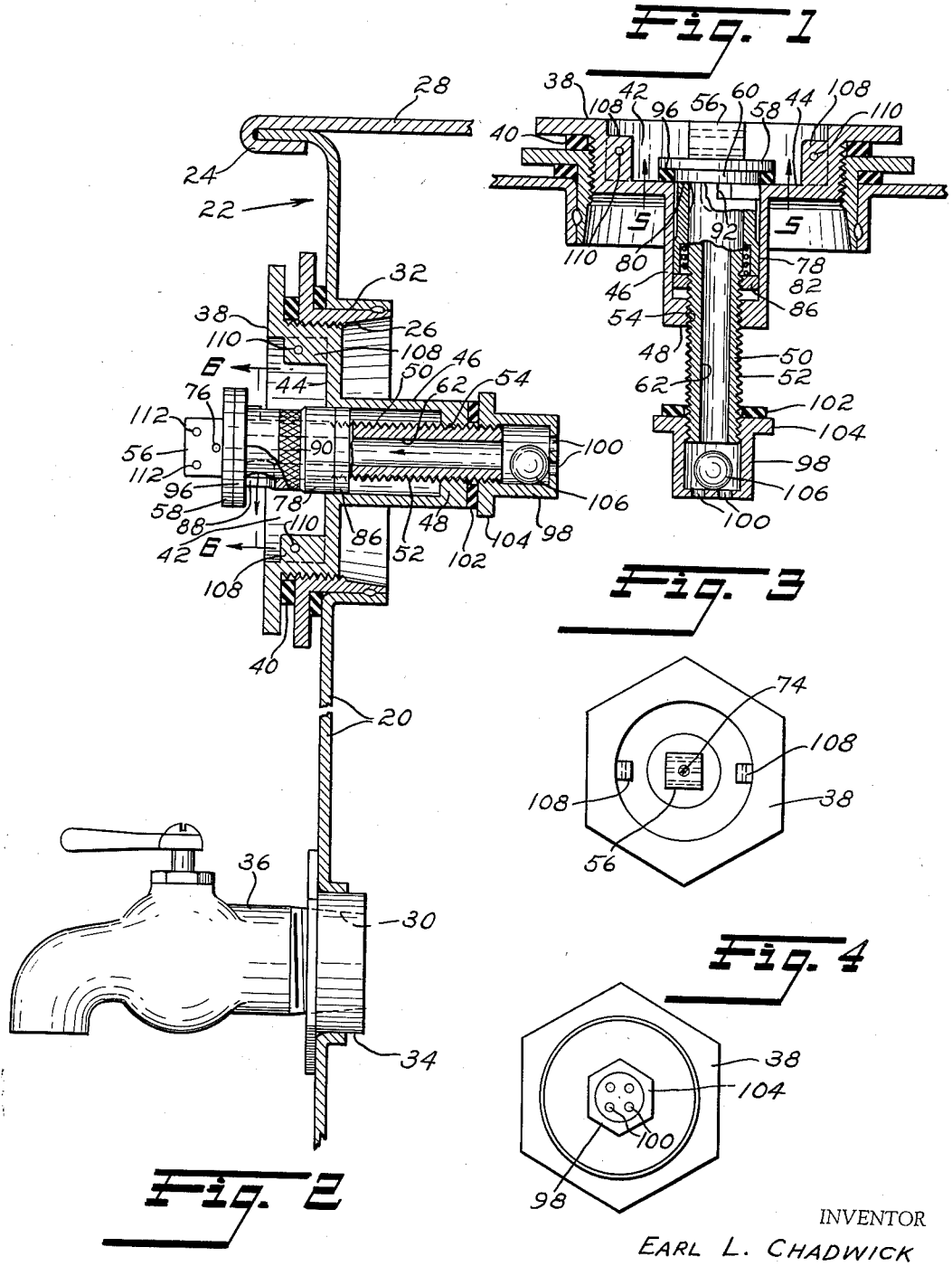
INVENTOR
EARL L. CHADWICK
BY Cushman, Darby & Cushman
ATTORNEYS March 20, 1956   E. L. CHADWICK   2,738,796
COMBINED VENT AND PRESSURE RELIEF VALVE UNIT
Filed Aug. 11, 1952   3 Sheets-Sheet 2
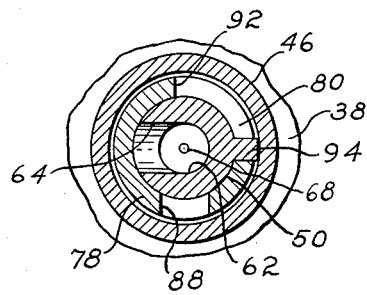
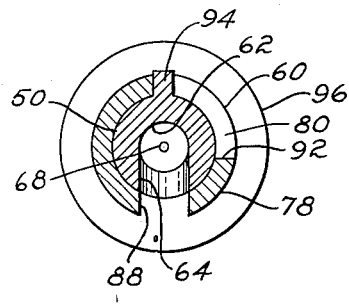
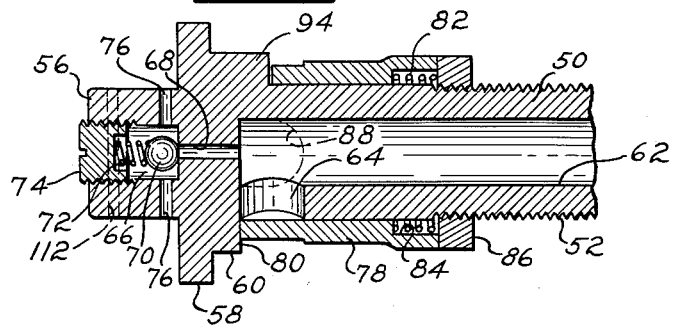
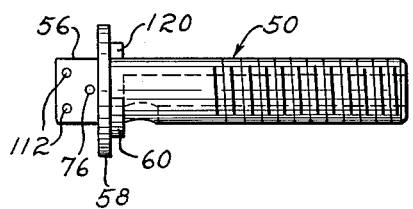
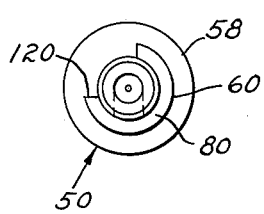
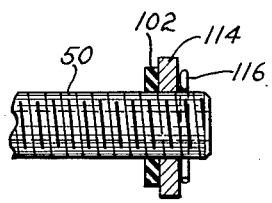
INVENTOR
EARL L. CHADWICK
BY Cushman, Darby & Cushman
ATTORNEYS March 20, 1956  E. L. CHADWICK  2,738,796
COMBINED VENT AND PRESSURE RELIEF VALVE UNIT
Filed Aug. 11, 1952  3 Sheets-Sheet 3

INVENTOR
EARL L. CHADWICK

BY Cushman, Darby & Cushman
ATTORNEYS

United States Patent Office 2,738,796
Patented Mar. 20, 1956

2,738,796
COMBINED VENT AND PRESSURE RELIEF VALVE UNIT

Earl L. Chadwick, Portland, Oreg.

Application August 11, 1952, Serial No. 303,673

6 Claims. (Cl. 137—43)

This invention relates to a combined pressure relief and vent valve construction for incorporation in liquid container closures. This application is a continuation-in-part of the copending application of Earl L. Chadwick, Serial No. 223,127, filed April 26, 1951, now abandoned.

Liquid containers which are adapted to be filled with volatile fluids, such as gasoline and the like, or even volatile semi-liquids, must be provided with a pressure relief valve in order to relieve excessive pressures therein. Such pressures are developed, for example, by exposure to the heat of the sun. Thus developed excessive pressures, if not relieved, might either burst the container or cause leakage therefrom. Additionally, it is desirable to provide liquid containers with convenient venting means to prevent the container from becoming suction-bound when the liquid contents thereof are being dispensed.

This invention has particular application to transportable liquid containers in the nature of tanks, barrels, drums, and the like, of 15, 30, or 55 gallons in size. Although the invention will be described with particular reference to containers of this nature, it will be realized that the invention is applicable to even larger containers such as large permanently emplaced storage tanks, tank cars, or the like.

Metal drums, for which this invention is particularly adaptable, usually have two openings in one end thereof, such openings being diametrically disposed and each adjacent a side of the container. One of these openings usually is used for filling purposes and is closed by a removable closure plug or cap. The other opening usually is smaller and is plugged for replacement by a faucet or other type of dispensing mechanism. Further, the rim or end edge of the drum usually has a chime, and the closures for the aforementioned openings are disposed below the level of such chime in order to permit stacking of the drums.

Combination vent and pressure relief valves of the type under consideration are known in the art, but existing units of this nature not only are bulky and expensive to manufacture, but also in most all instances project upwardly beyond the chime of the drum to thereby prevent stacking. Further, known units of this type are not readily incorporated in a container closure.

The venting of a container during dispensing of liquid therefrom may, of course, be accomplished by removal of the filling opening closure. This procedure is objectionable, however, in that it leads to possible contamination of the contents of the container and to undue evaporation of such contents should the closure not be replaced at the end of the dispensing operation. Additionally, should the container be on a moving vehicle or a seagoing vessel, the resultant sloshing and surging of the liquid contents might possibly result in liquid spilling through the open filling opening. Further, should the container upset the closure removed, liquid spillage would result.

Accordingly, it is an object of this invention to provide an improved combined vent and pressure relief valve which may be incorporated in a closure for a container of the type under consideration.

It is another object of this invention to provide a combination valve unit of the type under consideration which is adapted to be incorporated readily in a container closure.

It is still another object of this invention to provide a combination valve unit or a container with an adapter element for ready incorporation of the valve in various sizes of container closures.

It is still another object of this invention to provide a combination valve unit of the type under consideration which, in normal position, will not project upwardly beyond the chime of a container to thereby permit stacking of the latter.

It is still another object of this invention to provide a combination valve unit of the type described with a surge valve operable upon surges of the liquid within the container or upon an upsetting of the container to close the vent passageway when the latter is in venting condition.

It is a further object of this invention to provide an inexpensive and light-weight valve unit which will fulfill the above objects.

Other objects and advantages of the invention will become apparent from the following description and accompanying drawings, in which:

Figure 1 is a fragmentary sectional view through the filling opening of a metal drum and illustrating a closure in such opening which embodies a combination valve unit of this invention. The drum is shown in upright position and with the vent valve closed.

Figure 2 is a view corresponding to Figure 1, but illustrating the container turned on its side and having a dispensing faucet connected into the dispensing opening of the container. The combination valve unit embodying this invention is shown in position for venting the interior of the container during a dispensing operation.

Figure 3 is an exterior end view of the container closure shown in Figure 1.

Figure 4 is an interior end view of the container closure shown in Figure 1.

Figure 5 is a sectional view taken on line 5—5 of Figure 1.

Figure 6 is a sectional view taken on line 6—6 of Figure 2.

Figure 7 is an enlarged fragmentary longitudinal sectional view of certain of the elements illustrated in Figure 1.

Figure 8 is a side elevational view of a modification of the stem illustrated in Figure 1.

Figure 9 is an end view of the element illustrated in Figure 8 and taken from the right-hand end of the latter figure.

Figure 10 is a side elevational view of a modification of the sleeve element shown in Figure 1 for use with the stem shown in Figure 8.

Figure 11 is a side elevational view, partly in section, of another modification of the stem illustrated in Figure 1.

Figure 12:
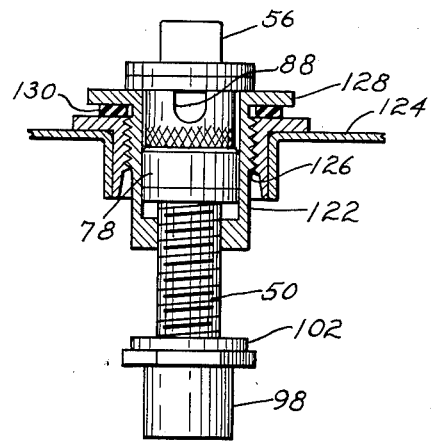
Figure 13:
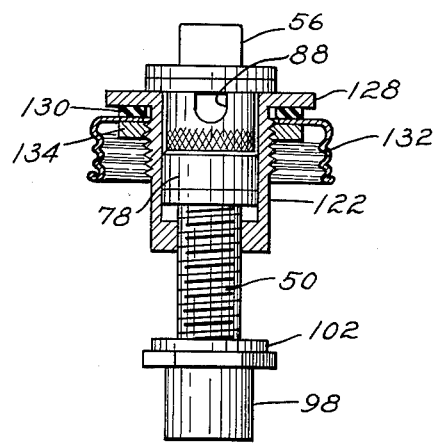
Figure 14:
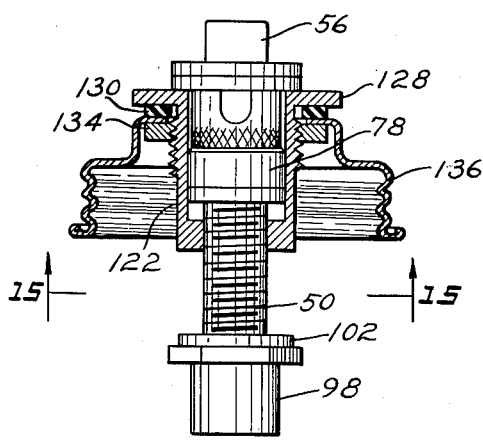

Figures 12, 13, and 14 are views, corresponding in part, to Figure 1, but illustrating modifications of this invention.

Figure 15:
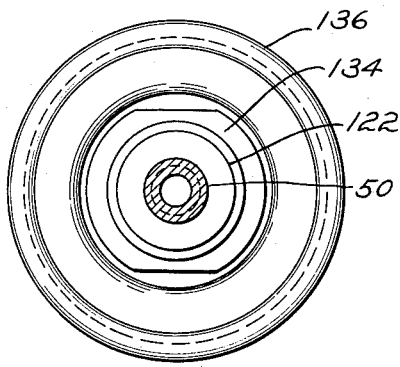

Figure 15 is a view taken on the line 15—15 of Figure 14.

Referring now to the drawings, there is shown in Figures 1 and 2 the end wall 20 of a liquid container 22 which may be in the form of a drum having a chime 24. The wall 20 is provided with a large filling opening 26 adjacent one side 28 of the drum and a smaller dispensing opening 30 adjacent the other side (not shown) of the drum. Both of these openings 26 and 30 are appropriately reinforced, as by means of interiorly threaded flanged bushings 32 and 34 that are welded or otherwise suitably secured in place within such openings. The smaller opening 30 normally is closed by a plug (not shown) which is adapted to be replaced by a dispensing device, such as a faucet 36. The larger or filling opening 26 of the drum 22 is provided with an exteriorly threaded flanged closure member or plug 38 having a conventional sealing washer 40.

The plug 38 has a relatively deep recess 42 in its outer face and extending inwardly from the bottom wall 44 of such recess is a barrel portion 46 having an open outer end and an interiorly threaded and restricted inner end. The interior restriction of the inner end of the barrel may be termed an interior circumferential flange 48. Engaged within the interior flange 48 of the barrel 46 is a stem 50 of smaller outer diameter than the interior of the barrel 46 to provide an annular space therebetween. Exterior threads 52 on the stem 50, extending from the inner end thereof to about midway of the length thereof, engage with the flange threads 54 so that the stem may be adjusted axially within the barrel 46 by rotation of the former. The outer end of the stem 50 has a square, or otherwise appropriately shaped, wrench-receiving head 56 having at its base a circumferential flange 58 adapted to overlie the bottom wall 44 of the plug 38, i. e. the rim of the barrel. Immediately adjacent the flange 58 and on the inner side thereof is another circumferential enlargement or flange 60 receivable in and of only slightly smaller diameter than the interior diameter of the barrel 46. The stem 50 is provided with an interior bore extending outwardly from its inner end to form an axial passageway 62 which extends to a point adjacent the flange 60. At this point the interior passageway 62 is provided with a lateral port 64.

The outer end of the square head 56 has a cylindrical axial recess 66 therein (Figure 7). The bottom of this recess 66 communicates with the stem passageway 62 by means of a small drilled passageway 68. Seating against the outer end of the small passageway 68 is a ball valve 70 which is loaded by a compression coil spring 72 interposed between the ball and a closure plug 74 threaded into the outer end of the cylindrical recess 66. The interior of the recess 66 communicates with the atmosphere by a plurality of lateral ports 76. Obviously, pressure within the container 22 will act, via the passageways 62 and 68, to unseat the ball 70 to thereby relieve excessive pressures in the container. The pressure relief valve, constituted by this construction, may be adjusted to relieve at various pressures by adjustment of the plug 74 to vary the compression on the spring 72.

The lateral port 64 of the stem passageway 62 normally is covered by a sleeve 78 rotatably mounted on an unthreaded portion of the stem 50 and of an outer diameter slightly less than the interior diameter of the barrel 46 so that such sleeve may be received within the barrel, as illustrated best in Figure 1. The sleeve 78 is maintained in relatively tight engagement against the shoulder 80 formed by the inner circumferential enlargement or flange 60 by a helical compression spring 82 disposed in an interior circumferential enlargement or recess 84 at the rear end of the sleeve. The spring 82 bears at one end against the shoulder formed at the base of the recess 84 and at the other end against a nut 86 threaded on the stem 50. At its forward end the sleeve 76 is provided with a lateral slot or port 88, adapted, upon rotation of the sleeve, to cover and uncover the lateral port 64 in the stem 50 in order to vent the interior of the drum 22 to the atmosphere. Preferably, the sleeve 78 is exteriorly knurled, as at 90, to facilitate manual rotation thereof. The sleeve 78 also is provided with a 90° slot 92 in the rim of the outer end thereof engageable with a key projection 94 on the stem to limit rotation of the sleeve to substantially 90° and for aligning the sleeve port 88 with the stem port 64 at one end of the sleeve's angular adjustment.

A sealing washer 96, preferably of nylon or the like, surrounds the inner circumferential enlargement or flange 60 on the stem and is adapted to be pressed against the bottom 44 of the recess 42 in the closure member 38 by the outer circumferential stem flange 58, as best illustrated in Figure 1.

Threaded onto the inner end of the stem 50 is a cuplike valve cage 98 having a plurality of ports 100 in the bottom thereof. A sealing washer 102, preferably of nylon or the like, is interposed between the inner end of the barrel 46 and an exterior circumferential flange 104 on the open end of the cage 98. Disposed within the cage 98 is a ball valve 106 adapted to seat against the inner end of the stem 50 to thereby close the passageway 62, for reasons later described.

In operation of the device embodying this invention, the closure member 38 is tightly screwed into the filling opening 26 of the drum 22, as illustrated in Figure 1, the sleeve 78 is rotated to close the port 64, and the square head 56 of the stem is engaged by an appropriate wrench to thread the stem into the barrel 46 until further inward movement of the stem is stopped by the stem flange 58. In this position of the parts, as shown in Figure 1, it will be observed that the gasket 96 tightly seals the stem against any leakage whatever out of the lateral port 64. It will be noted, however, that the pressure relief valve remains effective to relieve excessive pressures developed within the container by reason of the heating of the volatile contents thereof, or for any other reason. In this same position of the stem 50 it is pointed out that the stem head 56 is substantially flush with the rim of the closure member 38 to protect such head from damaging blows and also to permit stacking of containers without interference by a protrusion beyond the chime 24.

In the event that it is desired to seal the stem 50 in this position against unauthorized manipulation, the closure member 38 may be provided with diametric lugs 108 in the recess 42, which are provided with openings 110 through which a sealing wire (not shown) may pass and extend through openings 112 drilled through the stem head 56 on each side of the recess 66 therein and parallel to the lateral ports 76. Since drums and liquid containers usually are stood on end so that the filling opening is uppermost, the surge valve 106 is completely ineffective to block the passageway 62 through the stem and thus assures that the pressure relief valve remains effective at all times.

When it is desired to dispense the contents of the container 22, the latter usually is turned on its side with the dispensing opening 30 lowermost so that a previously inserted faucet 36, or the like, is adjacent the bottom of the liquid in the container. An appropriate wrench is then applied to the stem head 56 and the stem 50 rotated to advance the entire stem outwardly to the position shown in Figure 2, i. e. a position wherein the lateral port 64 in the stem clears the side walls of the barrel 46 and access may be had to the sleeve 78. The sleeve 78 is then rotated manually through 90° to align the port 88 therein with the lateral port 64 in the stem so that the air space above the liquid contents of the container is vented to the atmosphere. Thereupon liquid may be dispensed through the faucet 36 with no danger of the contents of the container becoming suction-bound. The container may remain in this position for an indefinite period, but at the end of each dispensing operation a simple manipulation of the sleeve 78 serves to close the lateral vent port 64 in the stem to thereby completely protect the contents of the container against possible contamination or against excessive evaporation with resulting loss. It also will be noted that in this position of the parts the washer 102 is tightly pressed against the inner end of the barrel 46 by the valve cage 98 so that leakage of liquid or vapors between the threaded connection of the barrel and the stem is impossible.

As heretofore stated, if the container is on a moving vehicle or on a boat so that the contents thereof are subject to surges during the dispensing operation, an outrush of liquid through the passageway 62 will seat the ball valve 106, as illustrated by the dotted lines of Figure 2, to block the inner end of the stem passageway and thereby prevent liquid from passing through such passageway and escaping and spilling out of the vent ports 64 and 88. Therefore, the surge valve eliminates a messy and unsanitary condition which might otherwise arise. In the event that the container should upend while the vent port 64 is open, the surge valve obviously will close.

If the surge valve is deemed to be unnecessary, as, for example, in using the valve unit as a dispenser in place of the faucet 36, the modification of the invention illustrated in Figure 11 is used. In this form of the invention the valve 106 and cage 98 are removed and replaced by a nut 114 to retain the inner stem washer 102 in place. The nut 114 is retained on the stem 50 by a cotter pin 116 extending diametrically therethrough.

Referring now to Figures 8, 9, and 10 of the drawings, there is shown a modification of the invention wherein the interengaging rotation-limiting means between the sleeve 78 and the stem 50 are formed by an axially extending key 118 on the sleeve engaged in a substantially 90° slot 120 in the inner circumferential enlargement or flange 60 on the stem. By means of this construction it is possible to manufacture the entire stem on an automatic screw machine, which permits the stem to be held to fine tolerances and is greatly desirable when the stem is formed of certain materials, such as stainless steel.

Referring now to Figure 12 of the drawings, there is shown a modification of this invention wherein a barrel 122 is adapted and formed to be used per se as a closure for a container 124 having a smaller filling opening than that shown in Figures 1 and 2. In this modification of the invention the barrel 122 is exteriorly threaded to engage complementary threads within the reinforced opening 126 of the container 124. The outer end of the barrel 122 is provided with an exterior circumferential flange 128 for the interposition of a sealing washer 130 between such flange and the rim of the filling opening 126.

Referring now to Figure 13, it will be seen that the barrel 122 shown in Figure 12 also serves as an adapter when it is desired to incorporate this invention in a cap type closure 132 for a container (not shown) having an exteriorly threaded neck type filling opening. In this modification, the cap 132 is centrally apertured to receive the barrel 122 and the rim of such aperture is rigidly clamped between the barrel flange 128 and a nut 134 threaded onto the barrel. Again, a sealing washer 130 is interposed between the flange 128 on the barrel 122 and the outer surface of the cap 132. Figures 14 and 15 illustrate an identical form of construction save that the cap 136 is adapted to engage a container neck of larger diameter than that engageable by the cap 132 illustrated in Figure 13.

It will thus be seen that the objects of this invention have been fully and effectively accomplished. It will be realized, however, that the embodiments described and illustrated for the purposes of disclosing the principles of the invention may be changed without departing from such principles. Therefore, this invention embraces all modifications encompassed by the spirit and scope of the following claims.

I claim:

1. A combination air vent and pressure relief valve for incorporation in a removable closure for a liquid container, comprising: an open-ended barrel adapted to be incorporated in a liquid container closure and having a radially-inwardly extending circumferential flange at its inner end; a tubular stem longer than said barrel and threadedly engaged within said flange for axial adjustment, said stem having an axial passageway therethrough and a non-circular wrench-engageable head on the outer end thereof; an exterior circumferential flange on said stem adjacent the base of said head and engageable with the rim of said barrel to limit inward adjustment of said stem, said stem having a lateral vent port inwardly of said exterior flange; a packing washer on said stem between said exterior flange and said barrel rim; a ported sleeve rotatable on said stem to open and close said vent port, said sleeve being completely receivable within said barrel; and a pressure relief valve within said stem head controlling the outer end of said passageway and having a relief port disposed outwardly of said exterior flange.

2. The structure defined in claim 1 including a valve cage detachably mounted on the inner end of said stem and a ball valve within said cage operable by liquid surges to close the inner end of the stem passageway.

3. The structure defined in claim 1 including interengageable stop means on said stem and sleeve for limiting rotation of the latter.

4. The structure defined in claim 1 including an exteriorly threaded container closure having a recess in the outer face thereof for completely receiving the stem head upon inward adjustment of the stem, and in which the barrel extends inwardly from the bottom of said recess.

5. The structure defined in claim 1 in which the barrel is exteriorly threaded and provided with an exterior circumferential flange at its outer end and including a clamping nut threaded on said barrel, securing the latter to the rim of a central aperture in a container closure.

6. A vent valve comprising: an open-ended barrel having an interior circumferential restriction at the inner end thereof; a stem threadedly engaged in said restriction for axial adjustment; head means on said stem sealingly engageable with the rim of said barrel, said stem having an axial passageway extending from the inner end thereof to a point inwardly of said head and a lateral vent port at said point; a ported valve sleeve rotatable on said stem to control said port, said sleeve being completely receivable within said barrel on inward adjustment of said stem; said head means having an axial recess therein, a lateral port for said recess, and a passageway providing communication between said recess and said stem passageway; a valve member in said recess for controlling the outer end of said head means passageway; an axially adjustable closure for said recess; and a spring interposed between said closure and said valve member for loading the latter.

References Cited in the file of this patent

UNITED STATES PATENTS

| | | |
|---|---|---|
| 660,096 | Francis | Oct. 23, 1900 |
| 675,548 | Long | June 4, 1901 |
| 1,144,991 | Bayles | July 6, 1915 |
| 1,223,047 | Heitz | Apr. 17, 1917 |
| 1,385,401 | Stockholder | July 26, 1921 |
| 1,486,985 | Monahan | Mar. 18, 1924 |
| 1,734,232 | Ryan | Nov. 5, 1929 |
| 1,894,064 | Schubenel | Jan. 10, 1933 |
| 1,924,057 | Draper | Aug. 22, 1933 |
| 1,859,126 | Boeuf | May 17, 1936 |
| 2,273,737 | Snyder | Oct. 17, 1942 |
| 2,347,737 | Fuller | May 2, 1944 |
| 2,374,690 | Laue | May 1, 1945 |
| 2,424,101 | Lari | July 15, 1947 |

FOREIGN PATENTS

| | | |
|---|---|---|
| 24,367 | France | 1922 |